United States Patent [19]

Coutta et al.

[11] Patent Number: 4,510,526

[45] Date of Patent: Apr. 9, 1985

[54] SURVEILLANCE SYSTEM

[76] Inventors: John M. Coutta, 22054 La Brisas Cir., Boca Raton, Fla. 33433; Paul A. Van Dusen, Lithonia, Ga. 30058

[21] Appl. No.: 486,511

[22] Filed: Apr. 19, 1983

[51] Int. Cl.[3] .............................................. H04N 7/18

[52] U.S. Cl. .................................... 358/108; 358/210; 358/229

[58] Field of Search ........................ 358/108, 210, 229

[56] References Cited

U.S. PATENT DOCUMENTS

| | | | |
|---|---|---|---|
| 3,686,434 | 8/1972 | Lemelson | 358/108 |
| 4,326,218 | 4/1982 | Coutta | 358/108 |
| 4,337,481 | 6/1982 | Mick | 358/108 |
| 4,337,482 | 6/1982 | Coutta | 358/108 |

*Primary Examiner*—Howard W. Britton

*Attorney, Agent, or Firm*—C. A. Phillips

[57] ABSTRACT

A surveillance system wherein a TV camera is pivotally mounted along its optical axis on or along a ceiling, and a mirror is pivotally mounted about an axis perpendicular to the optical axis to intercept the view of the camera. Then, by selected rotation of the camera and mirror about these axes, both pan and tilt functions are achieved in a very compact structure. Camera and mirror controls are effected by a wireless link to a carriage supporting the camera, and the video output of the camera is applied as an output over a second wireless link. Further, power for locomotion of the carriage, orientation of elements on the carriage, and for electronic circuitry on the carriage is all provided via a battery on the carriage. The charge on the battery is maintained by a trolley-type power application system.

3 Claims, 12 Drawing Figures

SURVEILLANCE SYSTEM

TECHNICAL FIELD

This invention relates generally to surveillance systems employing television cameras, and particularly to a means of effecting a scanning of view over a selected area.

BACKGROUND ART

In the applicant's previously patented system, U.S. Pat. No. 4,326,218, the applicant disclosed a surveillance system employing a camera adapted to be moved within a concealed track mounted on the ceiling of a business establishment to be protected and powered and controlled by a wired system as also described herein.

It is the object of this invention to provide an improved system in which the feasible of length of an installation is extended and maintenance costs are reduced.

DISCLOSURE OF THE INVENTION

In accordance with this invention, a TV camera is mounted on a tilting frame, and in accordance with one aspect of the invention, this frame is mounted to a transporter, and the transporter is in turn supported by a special linear rail assembly extending over a selected path. The rail assembly is typically suspended from the ceiling of an establishment, typically being along a side of a series of stations or positions to be observed, although it can view stations or positions on both sides of the rail due to the unique tilting frame on which the TV camera is mounted. Alternate to a fixed wired system as disclosed in U.S. Pat. No. 4,326,218 and herein, the field of view of the TV camera is controlled via a wireless link, and video signals from the camera are sent via a second wireless link. By this configuration, the overall length of a system can be increased, cable replacement costs eliminated, and disassembly time for maintenance and repairs substantially decreased.

BEST MODE FOR CARRYING OUT THE INVENTION

Figure 2:
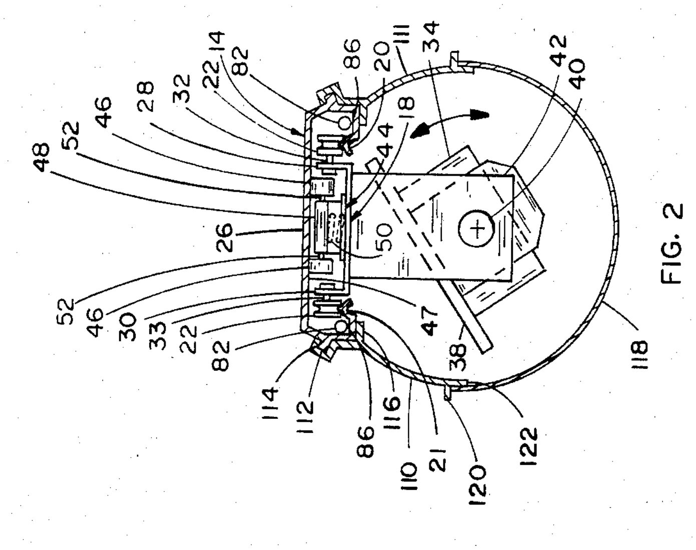
FIG. 2 is a sectional view taken along dashed line 2—2 of FIG. 1.
Figure 1:
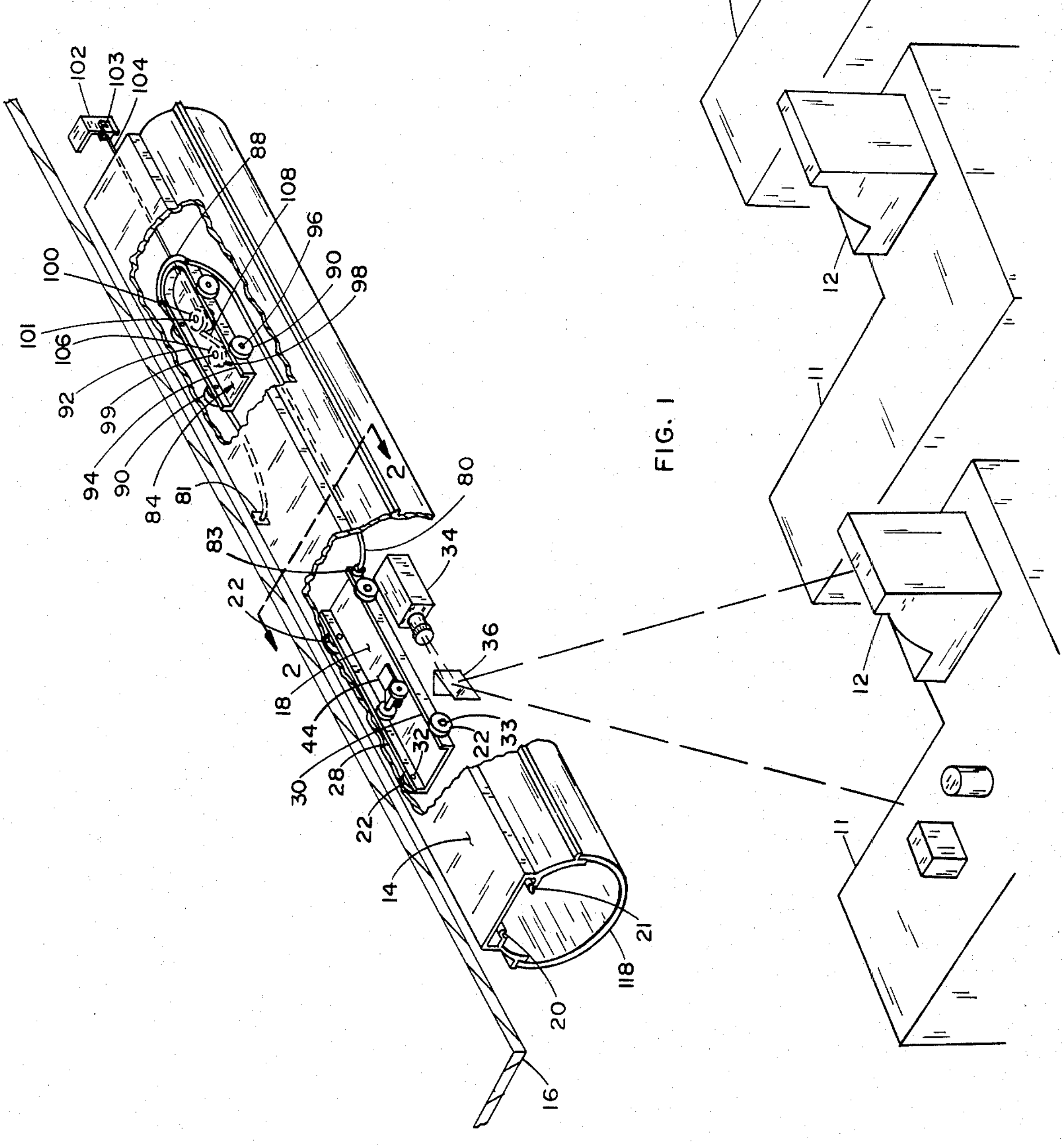
FIG. 1 is a pictorial view of a surveillance assembly and its use as contemplated by this invention.
Figure 3:
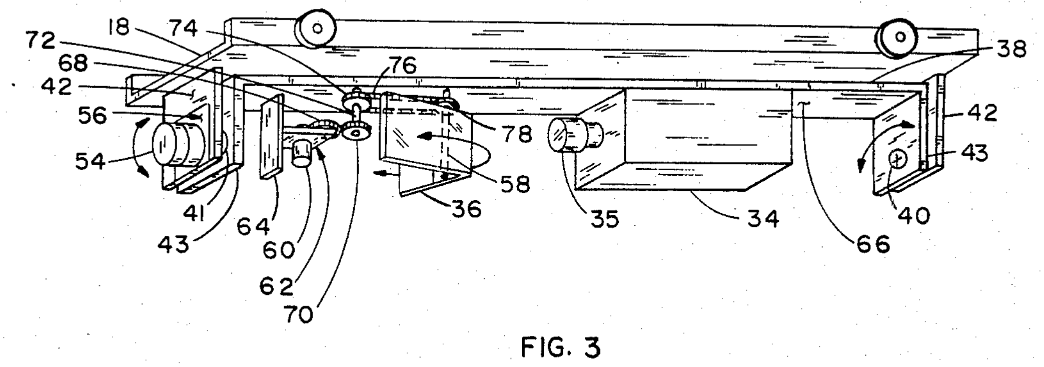
FIG. 3 is an enlarged perspective view of a portion of the surveillance assembly, particularly illustrating a tilting platform with a rotatable V-shaped mirror and TV camera.

Referring to the drawings, FIG. 1 shows an overall mechanical arrangement of an embodiment of the invention, and illustrating its position with respect to a number of cash register checkout stations 11 to be observed. It is adapted to generally observe the overall area of a station, including the merchandise on counter 11, the operation of cash register 12, and the activity of the checkout attendant. Rail assembly 14 is mounted to ceiling 16 (by means not shown). A camera transporter 18, as more specifically shown in FIGS. 2 and 3, is supported on rail members 20 and 21 (FIG. 2) by means of grooved wheels 22 (FIG. 2). Rail members 20 and 21 are extruded as integral parts of top plate 26 of rail assembly 14 (FIG. 2). Wheels 22 are mounted to sides 28 and 30 of transporter 18 by means of pins 32 and 33. Camera 34 and "V" mirror 36 are mounted to tilting platform 38 (FIGS. 2 and 3) (by means not shown). Platform 38 includes down-turned ends 43 (FIGS. 2 and 3) and is pivotal about pin 40 and shaft 41 coupling between ends 43 and end brackets 42 mounted to the bottom side of transport 18.

Figure 6:
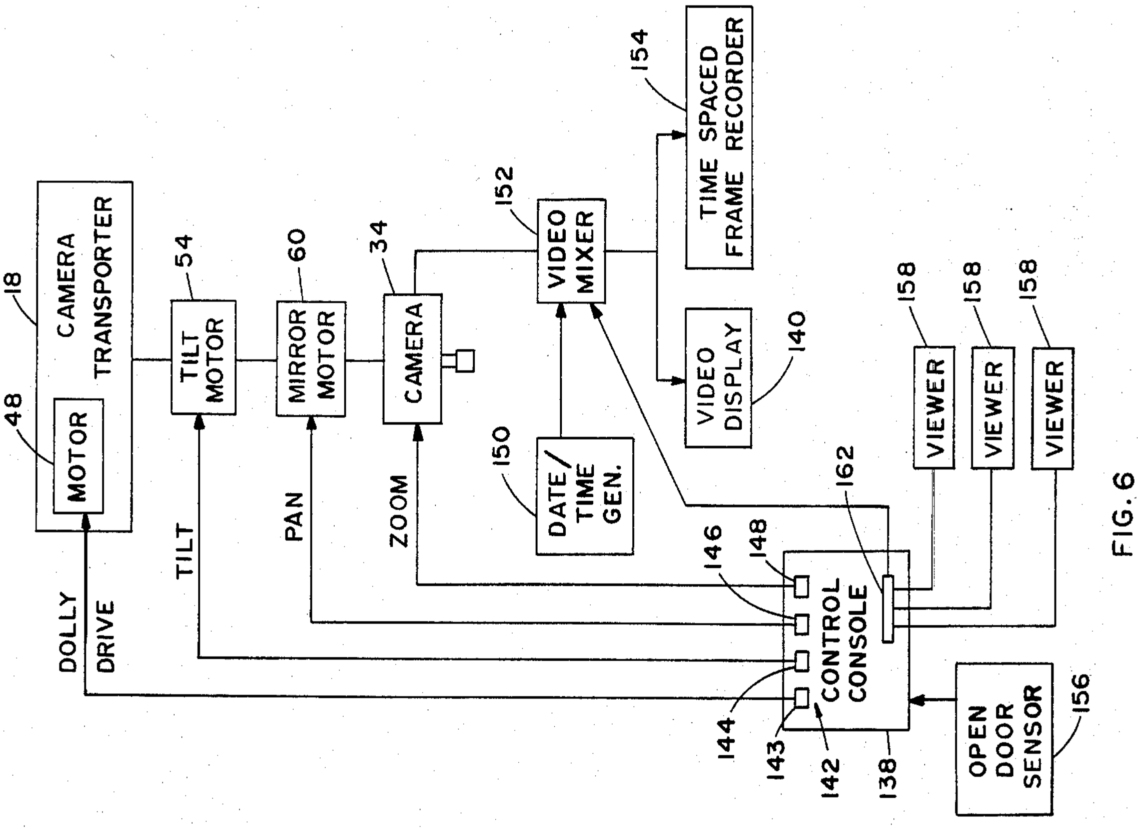
FIG. 6 is a schematic diagram of an overall arrangement of the system as contemplated by this invention.

Platform 38 (FIG. 3) can be tilted in either direction by reversible motor 54 of gear motor assembly 56 (mounted on a bracket 42), which drives shaft 41. "V" mirror 36 (FIG. 3), which is positioned so as to intersect the line of sight of camera lens 35 at all times, is rotatable about shaft 58 in either direction by reversible motor 60 of gear motor assembly 62, which is mounted to bracket 64 (by means not shown), which in turn is mounted to the bottom side 66 of tilt platform 38 (by means not shown). Drive gear 68 of gear motor assembly 62 drives gear 70, which is mounted to shaft 72, to which chain sprocket 74 is also attached (by means not shown). Sprocket 74 drives chain 76, which in turn drives sprocket 78 affixed to shaft 58, causing "V" mirror 36 to rotate about shaft 58 when motor 60 is activated. The foregoing arrangement allows camera 34 to view any station or position on either side of rail assembly 14. Camera 34 is equipped with a zoom type lens 35 (FIG. 3), which is remotely controlled by the control console (as shown in FIG. 6) in a conventional manner. With platform 38 tilted to any given angle on either side of rail assembly 14, a panoramic view of a large area is obtained without changing the position of the camera, this being done by rotating mirror 36 through the desired angle.

Referring to FIGS. 1 and 2, transporter 18 is propelled along rail sector members 20 and 21 in either direction by means of drive assembly 44. Friction drive wheels 46 of drive assembly 44 arms pressed against the bottom side 47 of top plate 26 by means of spring 50, which is attached to transporter 18 (by means not shown). Friction drive wheels 46 are coupled to reversible motor 48 of drive assembly 44 by means of drive shafts 52.

The tension of spring 50 is adjusted so that transporter 18 (FIG. 1) is effectively driven along rail sectors 20 and 21 in a positive, uniform manner when reversible motor 48 is operated.

The electrical power and signal inputs required to operate camera 34, transporter drive motor 48, tilt platform motor 54, and "V" mirror 60 is provided through electric cable assembly 80 (FIG. 1), which is attached to ceiling 16 through box 81 and to camera transporter 18 at junction box 83. Adequate tension is applied to the cable, and it is kept clear of wheels 22 on camera transporter 18 by means of the unique action of take-up dolly assembly 84. Cable assembly 80 normally lies in extruded grooves 86 on both sides of top plate 26 of rail assembly 14, except where it is conveyed around the back end of dolly assembly 84 through conduit sector 88, through which it can slide freely. Dolly assembly 84 is supported on rail sectors 20 and 21 by grooved wheels 90, which are mounted to sides 92 and 94 of dolly assembly 84 by means of pins 96.

Constant force spring motor assembly 98 (FIG. 1), a conventional and commercially available unit, is mounted to the bottom of dolly assembly 84 by pins 99 and 101 in such a manner that take-up drum 106 and output drum 100 can rotate freely in either direction. Output drum 100 is connected to anchor bracket 102 by means of tether cable 104, which is wound around the output drum. Bracket 102 is mounted to ceiling 16 (by means not shown). Tether cable 104 is attached to anchor bracket 102 by clamp 103. When camera transporter 18 is driven forward (to the left) by drive assembly 44, cable assembly 80 also pulls dolly assembly 84 forward along with the transporter, but at a discrete distance behind it. This causes flat motor spring 108 to be wound on motor take-up drum 106, thus storing energy in spring motor assembly 98, while at the same time output drum 100 unwinds cable 104, allowing dolly 84 to move forward with the transporter. When motor 48 drives transporter 18 in the reverse direction, spring motor assembly 98, which was wound up by the forward motion described above, winds tether cable 104 up again on output drum 100, pulling dolly 84 back toward anchor bracket 102, and taking up the slack in electrical cable assembly 80, allowing it to lie flat in grooves 86 and keeping it off tracks 20 and 21, thus avoiding damage to the cable by wheels 22 on transporter 18 and avoiding interference with the normal travel of the transporter.

In addition, rail assembly 14 is configured, as best shown in FIG. 2, to also support opaque shroud or cover extensions 110 and 111, which are similar and are configured to include a slot 112 which interlocks with rim 114 on opposite sides of top plate 26, and an additional rim 116 which fits tightly against the bottom of top plate 26, enabling rapid and secure installation, without fasteners, of shroud extensions 110 and 111 to top plate 26. The lower edges of shroud extensions 110 and 111 are adapted to receive, attach to, and hold a generally round cross section of camera obscuring shroud or cover 118 (FIGS. 1 and 2). Attachment is made by adhesive double-backed material or by rivets (not shown). To insure even attachment, an edge stop 120 is provided about ½ inch from lower edge 122 of shroud extensions 110 and 111. Shroud or cover 118 is constructed of a material which generally passes 25% to 60% of incident light. Typically, it is tinted to a degree to effect the desired degree of light transmission. It is made sufficiently dark to make it difficult for anyone on the floor to view the movement or operation of the equipment inside cover 118. The fact that shroud or cover extensions 110 and 111 are opaque and semi-opaque cover 118 is nearly round, and thus highly reflective, also helps to hide or mask the camera and mirror from view from almost all positions on the floor.

Figure 4:
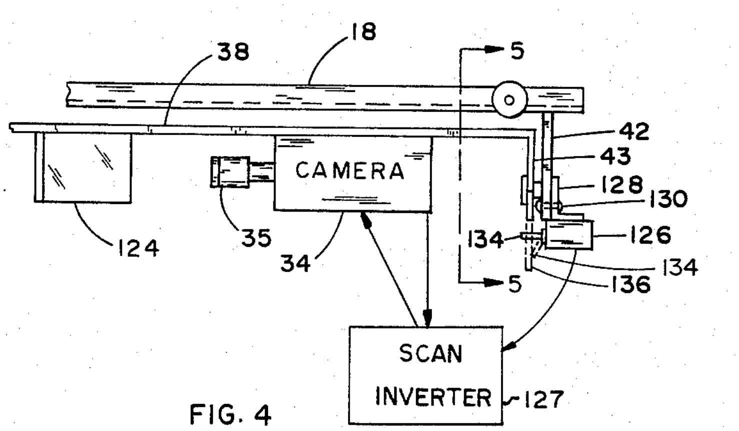
FIG. 4 is a partial view of a tilting platform with a fixed single face mirror and TV camera, with a camera scan inverting switch.
Figure 5:
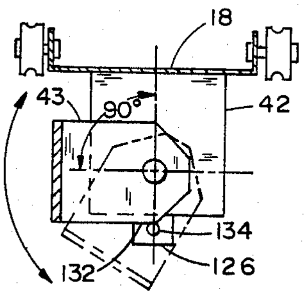
FIG. 5 is a sectional view taken along dashed line 5—5 of FIG. 4.

FIGS. 4 and 5 show a variation of this invention in which a fixed mirror 124 is attached to the bottom of tilt platform 38 in lieu of rotatable "V" mirror 36 (FIG. 3). Mirror 124 is positioned at an angle in such a way that it intersects the line of sight of lens 35 of camera 34. A limit switch 126 is mounted to end bracket 42 of camera transporter 18 by means of clip 128 and rivets 130. When platform 38 is tilted through an arc of 90° (FIG. 5), edge 132 of end member 43 of the platform strikes and depresses toggle 134 of switch 126. When toggle 134 is depressed, switch 126 provides a signal to scan inverter 127, coupled between the conventional sync generator of camera 34 and the vertical and horizontal scanning inputs of the camera tube of camera 34. Basically, scan inverter 127 simply comprises a switchable phase inverter which, responsive to a switching signal, causes the horizontal and vertical scan or sweep signal to reverse phase. Thus, the horizontal scan is changed from the normal left-to-right movement to right-to-left, and the vertical scan from the normal top-to-bottom movement to bottom-to-top as the platform is tilted beyond the 90° tilt, up to a maximum of 180°. Toggle 134 is held in the depressed position by the back 136 of end member 43 (as best shown in FIG. 4), maintaining the reversed scanning operation of the camera through this quadrant. This arrangement allows camera 34 to view stations or positions on both sides of rail assembly 14 without the use of the more complex "V" mirror and corresponding drive and control mechanisms.

The overall electrical system of the invention is shown in FIG. 6. The system is controlled by a control console 138, which would be operated by an operator, who would view video display 140 and determine desired surveillance. Control console 138 contains conventional circuitry to apply by means of controls 142 the indicated output control signals to the devices they control. Thus, control 143 enables the operator to control the operation of drive motor 48 to position camera transporter 18 carrying camera 34 at a desired location as, for example, to view a particular checkout operation (as illustrated in FIG. 1). Tilt control 144 operates motor 54 to reversibly vary the tilt of platform 38 (FIG. 3) carrying camera 34. Mirror control 146 operates motor 60 to reversibly rotate "V" mirror 36 (FIG. 3) to provide the panning effect. Zoom control 148 operates the focal length control of camera 34 to vary the magnitude of the area or field to be viewed. The outputs of camera 34 and date/time generator 150 are combined in video mixer 152, resulting in a presentation on video display 140 of the scene viewed by the camera, with date/time digits displayed in one lower corner of the screen. Video recorder 154 is provided the same information as display 140 and may be operated continuously to accumulate information, or selectively turned on to record selected presentations. In order to provide effective monitoring over relatively long periods of time which may be presented on display 140 in a shorter time, means are provided to operate recorder 154 intermittently to thus, for example, record single frames at some selected relatively slow rate, say, one frame per second. This, for example, thus enables playback of these same frames in a much shorter time, enabling, for example, the monitoring of 48 hours of actual surveillance in approximately one hour.

Open door sensor 156 is responsive to a door (typically a back door) being opened and provides a signal to control console 138, which automatically causes a tilt signal to operate motor 54 and a pan signal to operate motor 60 to train camera 34 on a door of an establishment and to operate the zoom mechanism of camera 34 to adjust the focal length of the camera to the desired field of view. This aspect of the system enables the observation, for example, of a rear door to keep track of merchandise being brought into or leaving an establishment.

Figure 8:
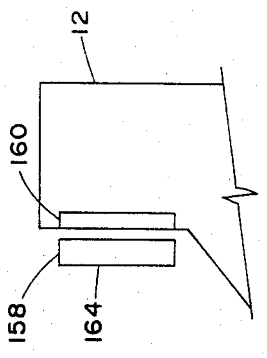
FIG. 8 is a sectional view taken along dashed line 8—8 of FIG. 7.
Figure 7:
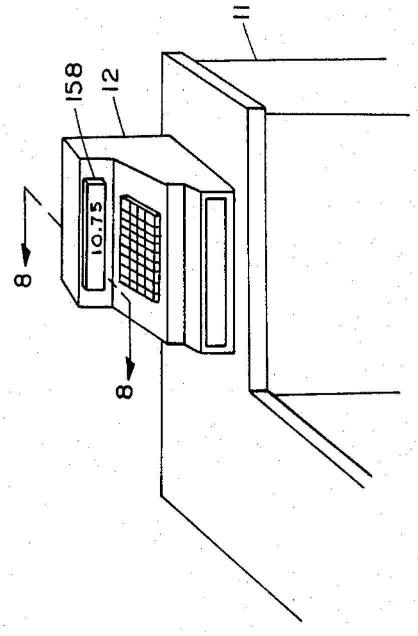
FIG. 7 is a perspective view of a viewing device for viewing the readout of a cash register.

FIGS. 7 and 8 cover another feature of this invention in which a display viewer 158 is mounted in front of the transaction display panel 160 of a cash register 12. Viewers 158 from several cash registers provide item price, tax, and total transaction information to control console 138. Control 162 allows the operator to transmit the information from the particular register or station being viewed by the camera at any particular time to video mixer 152, where the information can be displayed in one corner of the screen of video display 140 or recorded by recorder 154. Viewer 158 also simultaneously displays the information from the register on outer face 164 (FIG. 8) where it can be viewed by the checkout attendant. In one form, viewer 158 would have a matrix of photosensitive elements on the side facing the cash register display and a matrix of light emitting diodes on the opposite side. Signals from the matrix of photosensitive elements would both reproduce the cash register readout on the L.E.D. array and supply an electrical indication of same to control console 142 and then (after any necessary signal format translation) to video mixer 152.

Figure 9:
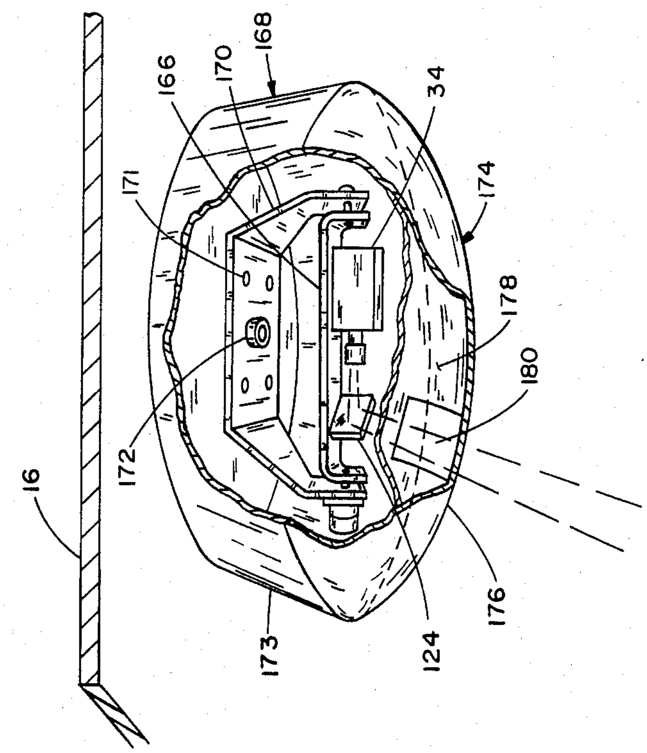
FIG. 9 is a perspective view of a modified form of this invention in which a tilting platform containing a TV camera and a fixed mirror is mounted in a rotatable dome.

FIG. 9 shows the mechanical embodiment of another version of this invention in which a compact low profile (5") tilting platform 166 supporting camera 34 and fixed mirror 124 is mounted in rotatable dome assembly 168, which is mounted to ceiling 16 (by means not shown). Platform 166 is mounted to bracket 170, which in turn is mounted to the top of dome assembly 168 by bolts 171. Dome assembly 168 is rotated in either direction about central pivot 172 by motor 184. Platform 166 is tilted in the same manner as platform 38 in FIG. 3. Dome housing 173, which is opaque, supports a laminated lower dome assembly 174 (by means not shown). Outer shell 176 of dome assembly 174 is of a semi-opaque plastic material similar to shroud 118 in FIG. 2. Inner liner 178, which is bonded to outer shell 176, is opaque, but has a slot 180 out in it through which camera 34 can view any desired station or position as the dome is rotated and the platform holding the camera and mirror is tilted in accordance with the operator's instructions.

Figure 10:
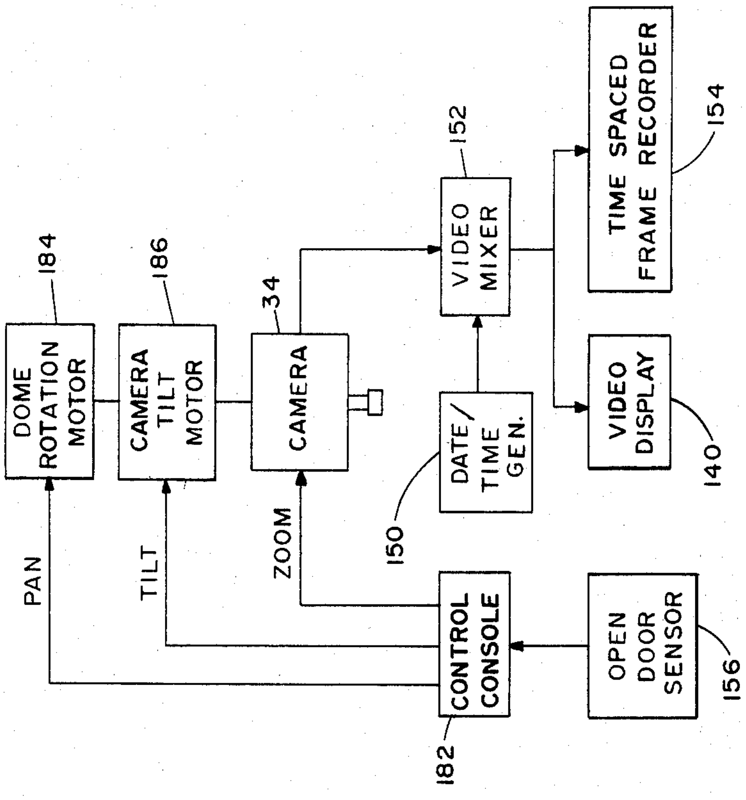
FIG. 10 is a simple schematic of the arrangement shown in FIG. 9.

Dome assembly 158 is controlled by the circuitry shown in FIG. 10 from control console 182. Control console 182 simply includes signal means for applying control signals to the control motor of dome assembly 168 to effect control of camera 10 in pan, tilt, and zoom functions. Thus, control console 182 would provide a device signal to dome rotation motor 184 when it is desired to effect a pan function. Similarly, control console 182 would provide tilt signals to camera tilt motor 186 when it is desired to tilt the angle of view, and would provide zoom control signals to camera 34 when it is desired to vary the focal length of the lens of the camera. The signal output of camera 34 is fed to video mixer 152, which mixes with this signal output a date/time signal from date/time generator 150. The resulting mixed signal is supplied by video mixer 152 to video display 140 and recorder 154 (as described above with respect to FIG. 6).

Figure 11:
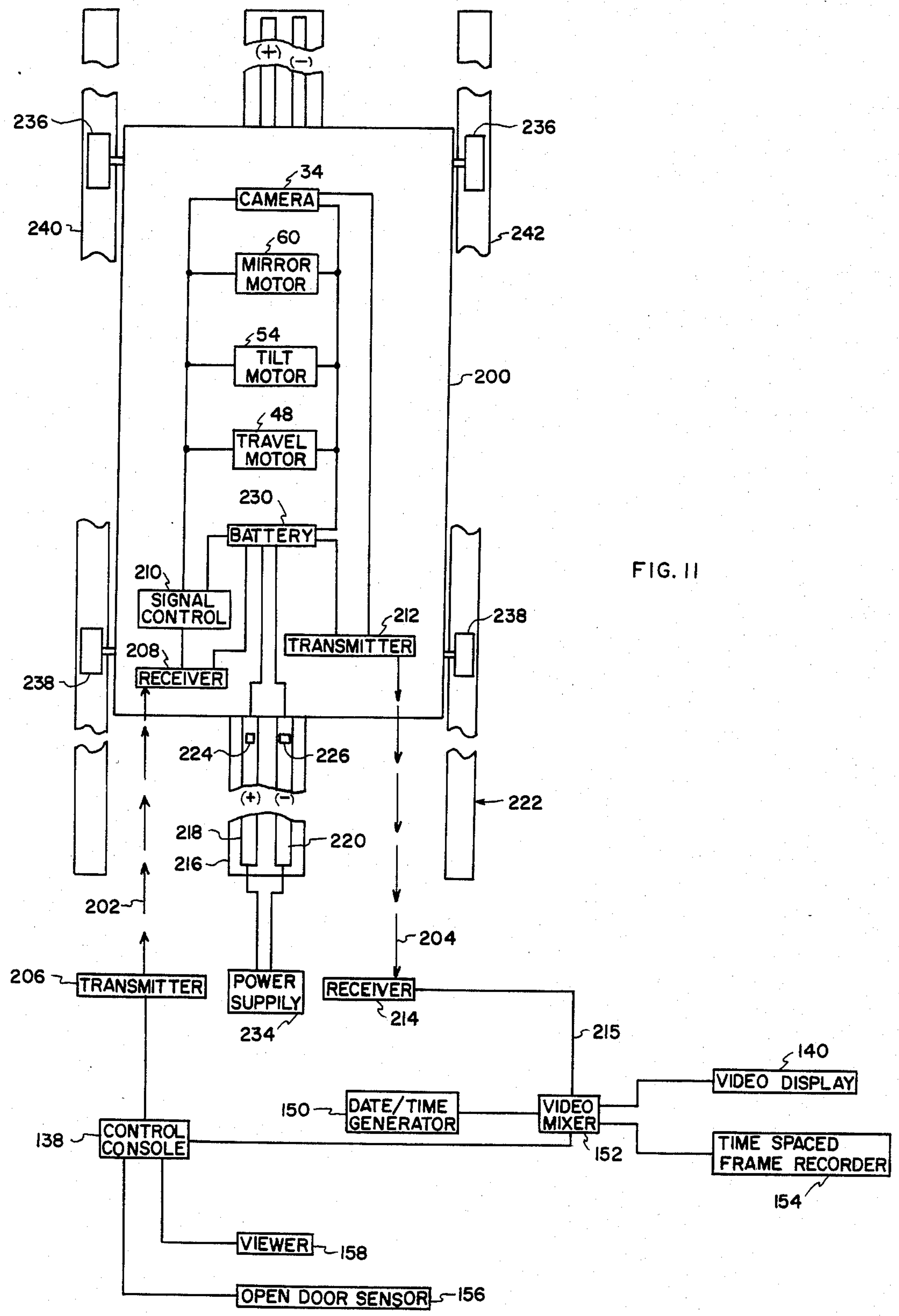
FIG. 11 is a schematic block diagram of a wireless arrangement as contemplated by this invention.

Referring to FIG. 11, there is shown a block diagram which basically differs from the one shown in FIG. 6 in that wireless communications are effected between components as shown by arrows 202 and 204. This is accomplished, for example, by using light waves such as those generated by infrared light or by radio transmissions. Such wireless communications are controlled by control console 138 which operates, modulates, signal transmitter 206 to generate a modulated (modulated by control signals) wireless signal that is received by signal receiver 208 on movable carriage assembly 200. Signal receiver 208, mounted on carriage assembly 200, conventionally demodulates control signals and supplies them to signal control 210 which activates specified components on carriage assembly 200 as commanded. Signal control 210 may thus be directed to operate camera 34, tilt motor 54, mirror motor 60, reversible travel motor 48 or any of their combination to achieve the desired results as described earlier.

Camera 34, when operated, sends its video signal to signal transmitter 212 which is also on carriage assembly 200. Signal transmitter 212 converts this video signal to a wireless signal modulated by the video signal and transmits it to stationary signal receiver 214. Signal receiver 214 conventionally demodulates the received wireless signal and supplies it through wire connection 215 to video mixer 152, which operates as previously described.

Direct current power is supplied to the components on carriage assembly 200 via battery 230. Battery 230 is of conventional construction and is directly wired, as shown, to camera 34, mirror motor 60, tilt motor 54, travel motor 48, signal control 210, signal receiver 208, and signal transmitter 212. Battery 230 is kept fully charged via power strip 216 which supplies a trickle charge voltage along its length. Power strip 216 includes a pair of separately insulated longitudinal power slots 218 and 220, slot 218 being positive and slot 220 being negative or ground. Power strip 216 is rigidly secured along rail assembly 222 adjacent to the travel of carriage assembly 200. Each power slot 218 and 220 in power strip 216 is configured to allow engagement by separate slidable brushes 224 and 226 along the length of these power slots. These brushes are secured to and move with carriage assembly 200 along rail assembly 222. Brush 224 slides within positive slot 218 and connects to the positive lead of battery 230 while brush 226 slides within negative slot 220 and connects to the negative lead of battery 230, thus continuously recharging battery 230 on carriage assembly 200. D.C. charging voltage is supplied to power slots 218 and 220 by power source 234 located at one end of power strip 216. Power source 234 transforms the available alternating current to a useful range of direct current so as to continuously charge battery 230. Alternately, an insulated wheel or wheels riding on a track or tracks may be employed to carry power.

As carriage assembly 200 is moved longitudinally within rail assembly 222 by front and back wheel pairs 236 and 238 which roll on parallel tracks 240 and 242. When carriage assembly 200 is moved within rail assembly 222, brushes 224 and 226 engage their respective slots 218 and 220 in power strip 216. This engagement supplies charging power to battery 230 mounted on carriage assembly 200. Battery 230, in turn, supplies power to each of the components on carriage assembly 200, including signal control 210. Control 210, when commanded by control console 138, activates the required components on carriage assembly 200 to carry out the desired operation. As carriage assembly 200 moves along tracks 240 and 242, signals are communicated between control console 138 and carriage assembly 200 via the wireless method described above, thus eliminating the need for wire connections between these components.

Figure 12:
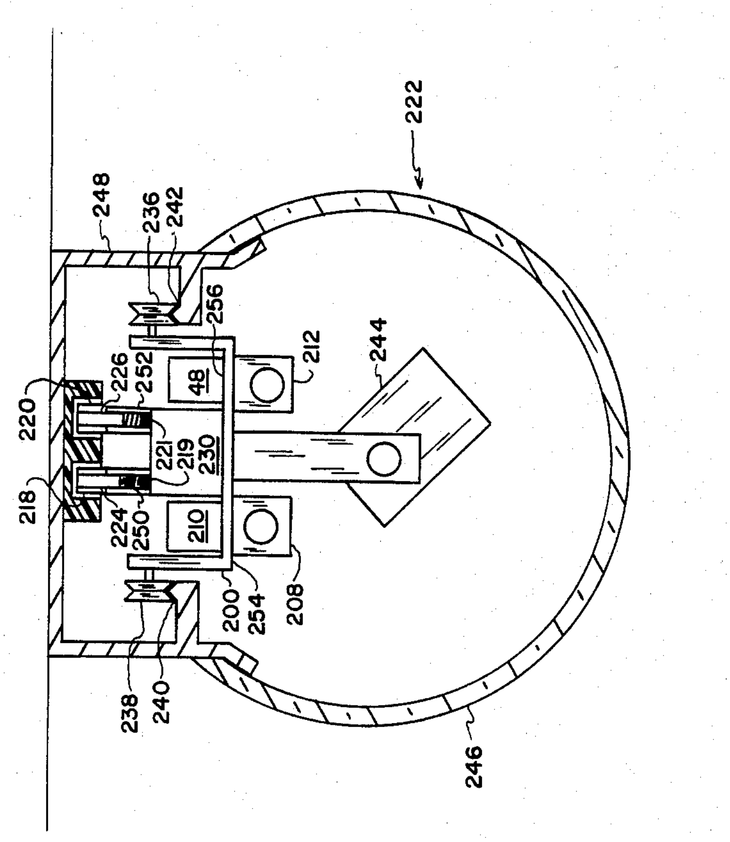
FIG. 12 is a diagrammatic view of the arrangement illustrated by FIG. 11.

To better illustrate this wireless assembly, reference is made to FIG. 12 which is a sectional view of rail assembly 222. There is shown carriage assembly 200 which moves on tracks 240 and 242 via wheel pair 238 which is shown and wheel pair 236 which is not shown. Carriage assembly 200 supports from its bottom side 254 signal receiver 208 and signal transmitter 212. Battery 230, signal controller 210, and travel motor 48 are supported on top side 256 of carriage assembly 200. Suspended from carriage assembly 200 is tiltable platform 244 which supports camera 34, mirror motor 60, and tilt motor 54 which are not shown. Brush 224, inserted within and engaging positive slot 218, connects to the positive terminal 219 of battery 230, and brush 226, inserted within and engaging negative slot 220, connects to the negative terminal 221 of battery 230. These brushes 224 and 226 are biased against slots 218 and 220 by springs 250 which are inserted within supports 252. Rail assembly 222 is enclosed by cover 246 and frame 248 which are similar to cover 118 and top plate 26 as previously described.

From the foregoing, it is to be appreciated that there has been provided an improved mode of TV camera surveillance, this being accomplished by the novel arrangement of optical viewing and camera supports wherein a very substantial step in miniaturization of the system is accomplished. Of course, in the field of surveillance, the less obtrusive the system, the greater its effectiveness. Of equal importance, however, is that in the system shown, substantial cost savings are effected by both miniaturization and assembly of the system.

We claim:

1. A surveillance system comprising:

an elongated track positioned along a path;

a carriage adapted to be supported on and be movable along said track;

electromotive means coupled to said carriage for selectively moving said carriage along said track;

a television camera having a video output signal;

mounting means for pivotally supporting said camera on said carriage about an axis lying along and central to said track, and wherein the direction of view of said camera generally lies along said axis;

pivot drive means interconnected to said mounting means and responsive to a pivot drive signal for rotating said mounting means and thereby said camera about said axis;

a mirror supported by said mounting means and angularly positionable within a selected range between a position wherein at lest one of its reflective surfaces is normal to the axis of view of said camera and a position wherein a reflective surface is parallel with said axis, and said mirror being positionable to intercept the view of said camera and enabling viewing of a region generally to one side of said axis;

carriage control means coupled to said electromotive means and responsive to a carriage control signal for selectively positioning said carriage, and thereby said camera, along said track;

fixed mounted control means for developing pivot input and carriage control signals;

first wireless transmission means, fixed mounted and responsive to said pivot input and carriage control signals from said control means for developing a first wireless signal modulated by said pivot input and carriage control signals and directing said wireless signal toward said carriage;

first wireless receiving means mounted on said carriage for receiving said first wireless signals from said first wireless transmission means, demodulating said first wireless signals, and providing pivot input signals to said pivot drive means and carriage control signals to said carriage control means;

second wireless transmission means mounted on said carriage and responsive to said video output signal for developing second wireless signals modulated by said video output signal and transmitting said second wireless signals;

second wireless receiving means, fixed mounted, and including means for receiving said second wireless signals from said second wireless transmission means and providing as an output a video signal;

display means responsive to said video signal for displaying said video output.

2. A surveillance system as set forth in claim 1 wherein said system includes:

a battery mounted on said carriage and being coupled to and supplying power for said electromotive means and said pivot drive means; and battery charging means comprising:

a stationary mounted source of charging voltage, and electrical contact means mounted on said carriage for coupling power from said stationary source of charging voltage to said battery, whereby the charge on said battery is maintained, and whereby any temporary losses in charging power would not effect the operation of said system.

3. A surveillance system as set forth in claim 2 further comprising:

rotation means responsive to an input signal for selectively angularly positioning said mirror;

said control means includes means for developing second electrical signals for directing the rotation of said mirror;

said first wireless transmission means includes means responsive to said second electrical signals for additionally including, as modulation on said second wireless signals, said second electrical signals;

said first wireless receiving means includes means for demodulating said second electrical signals and for providing as an output said second electrical control signals to said rotation means as a said input signal.

* * * * *